United States Patent [19]

Tax

[11] 4,200,162

[45] Apr. 29, 1980

[54] TRAVELING GANTRY

[76] Inventor: Hans Tax, Potsdamer Strasse 3, D-8000 Munich 40, Fed. Rep. of Germany

[21] Appl. No.: 888,559

[22] Filed: Mar. 20, 1978

[30] Foreign Application Priority Data

Mar. 28, 1977 [DE] Fed. Rep. of Germany ....... 2713692
Aug. 5, 1977 [DE] Fed. Rep. of Germany ....... 2735385

[51] Int. Cl.[2] .............................................. B62D 5/04

[52] U.S. Cl. ...................................... 180/23; 180/234; 180/79.1; 180/140

[58] Field of Search ........................ 180/21, 22, 23, 24, 180/24.01, 24,05, 45, 140, 79.1

[56] References Cited

U.S. PATENT DOCUMENTS

| | | | |
|---|---|---|---|
| 3,280,931 | 10/1966 | Cahill et al. | 180/79.1 |
| 3,387,684 | 6/1968 | Belke et al. | 180/79.1 |
| 3,404,746 | 10/1968 | Slay | 180/23 |
| 3,572,458 | 3/1971 | Tax | 180/79.1 |
| 3,664,448 | 5/1972 | Hudis | 180/45 |
| 3,792,745 | 2/1974 | Files | 180/140 |

*Primary Examiner*—Joseph F. Peters, Jr.
*Assistant Examiner*—Donn McGiehan
*Attorney, Agent, or Firm*—Toren, McGeady and Stanger

[57] ABSTRACT

The bridge portion of a traveling gantry for a rotary crane has four carrier arms hingedly secured to the four corners of a platform for free pivoting movement in a plane adjacent and parallel to the normally horizontal platform surface which carries the crane. An upright member extends downward from the free end of each carrier arm in the normal traveling condition of the gantry, and its lower end carries at least one road wheel for rotation about a horizontally extending axis. Steering devices permit the several wheels to be turned about respective axes parallel to the pivot axes of the carrier arms. The bottom faces of the wheels jointly define a plane tangential to each wheel whose spacing from the platform is greater than all horizontal dimensions of the platform and adjacent upright members, in certain positions of the associated carrier arms define the horizontal width of a portal which is at least equal to the portal height between the tangential plane and the platform.

15 Claims, 14 Drawing Figures

| $\Delta\alpha_{1,2}$ | $\Delta\gamma_1$ | $\Delta\gamma_2$ |
|---|---|---|
| >0 | <0 | <0 |
| <0 | >0 | >0 |

Tab. I

| $\Delta\alpha_{3,4}$ | $\Delta\gamma_3$ | $\Delta\gamma_4$ |
|---|---|---|
| >0 | >0 | >0 |
| <0 | <0 | <0 |

Tab. II

| $\Delta\beta_1$ \ $\Delta\alpha_1$ | >0 | | <0 | |
|---|---|---|---|---|
| | $\Delta\gamma_{11}$ | $\Delta\gamma_{12}$ | $\Delta\gamma_{11}$ | $\Delta\gamma_{12}$ |
| >0 | <0 | <0 | >0 | >0 |
| | >0 | <0 | >0 | <0 |
| <0 | <0 | <0 | >0 | >0 |
| | <0 | >0 | <0 | >0 |

Tab. III

| Δα1 / Δβ1 | >0 | <0 |
|---|---|---|
| | Δγ1 | Δγ1 |
| >0 | >0 | <0 |
| | >0 | >0 |
| <0 | >0 | <0 |
| | <0 | <0 |

Tab. IV

| Δα2 / Δβ2 | >0 | <0 |
|---|---|---|
| | Δγ2 | Δγ2 |
| >0 | <0 | >0 |
| | <0 | <0 |
| <0 | <0 | >0 |
| | >0 | >0 |

Tab. V

TRAVELING GANTRY

This invention relates to traveling gantries, and more particularly to a gantry having a bridge portion from which upright members depend and carry respective wheels which may be steered individually.

Gantries of the general type described are in actual used in Europe. They provide a base broad enough for a jib crane, yet occupy little ground space since the platform and the upright members frame a portal that may be wide and high enough to permit road or railroad traffic to pass under the crane. The overall width of one of the known gantries may be of the order of 50 feet, making it difficult to move the gantry from one working site to another, and thereby losing much of the advantage gained by mounting the gantry on wheels.

It has now been found that the mobility of the known gantry can be improved greatly by incorporating therein features of the vehicle disclosed and claimed in my earlier U.S. Pat. No. 3,572,458.

The gantry of this invention thus comprises a bridge portion which includes a platform whose top surface defines a normally horizontal plane for supporting a crane and the like, and a plurality of elongated carrier arms. Hinges secure respective longitudinal end portions of the carrier arms to the platform for pivoting movement in a plane adjacent and parallel to the aforementioned horizontal plane about respective pivot axes spaced from each other and transverse to both planes. Each carrier arm has a free end remote from the associated hinge. An upright member is secured to each of the free ends and extends downward from the two mentioned planes in the traveling condition of the gantry. At least one road wheel is secured to a portion of each upright member downwardly remote from the planes for movement about a horizontally extending axis of rotation. A steering mechanism permits the wheels to be turned about respective steering axes substantially parallel to the pivot axes of the carrier arms.

Other features, additional objects, and many of the attendant advantages of this invention will readily be appreciated as the same becomes better understood from the following detailed description of preferred embodiments when considered in connection with the appended drawing in which.

Figure 11:
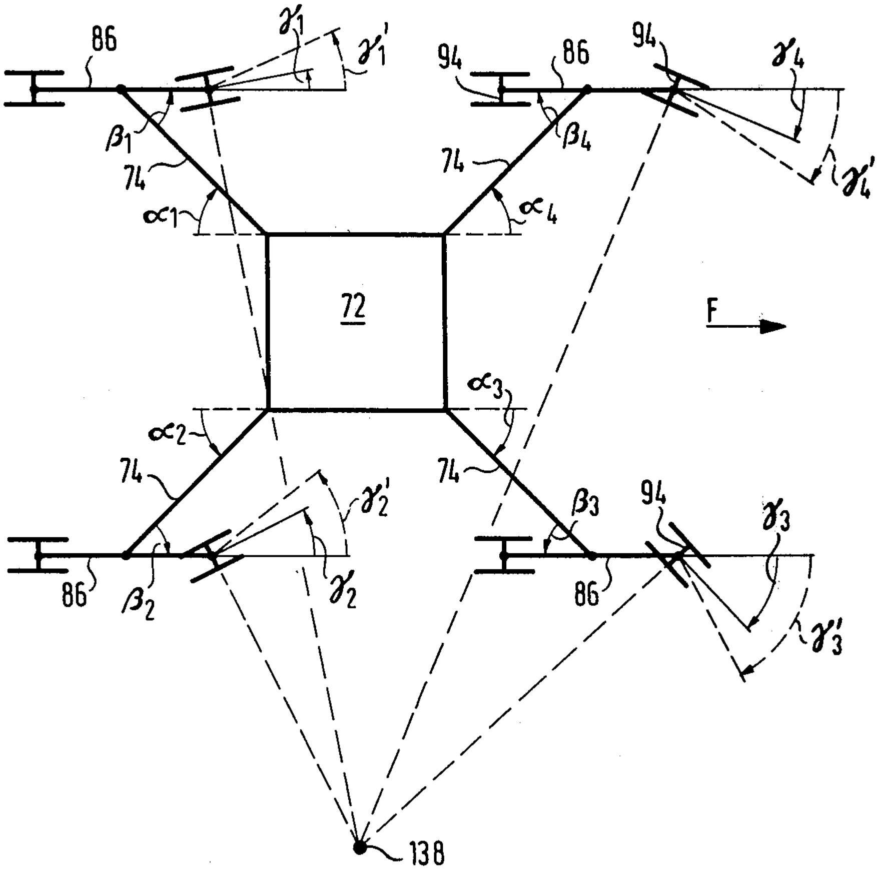
Figure 12:
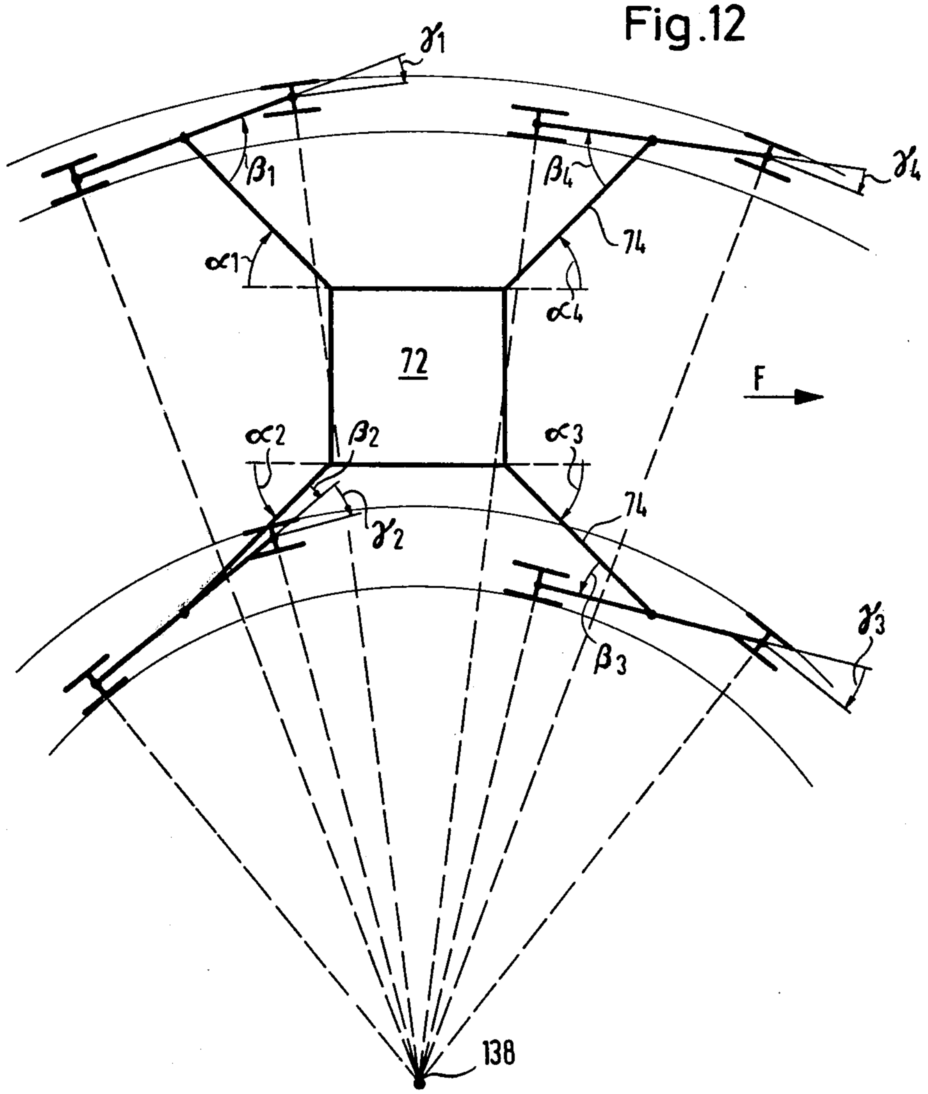
Figure 13:
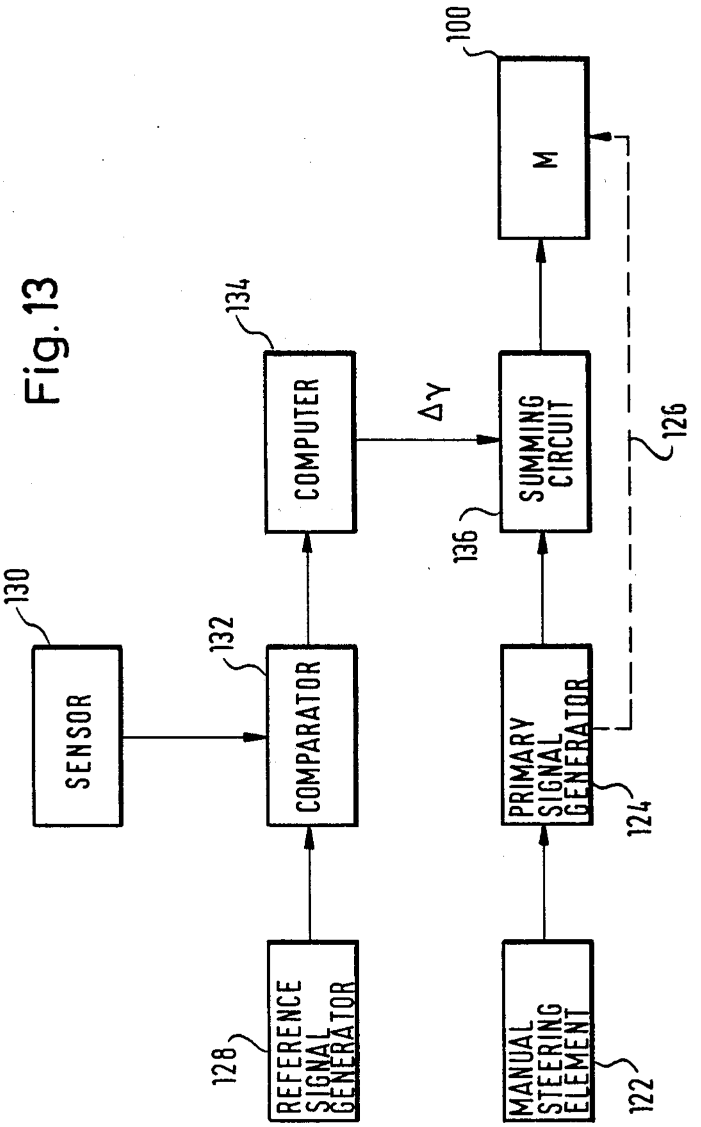
Figure 14:
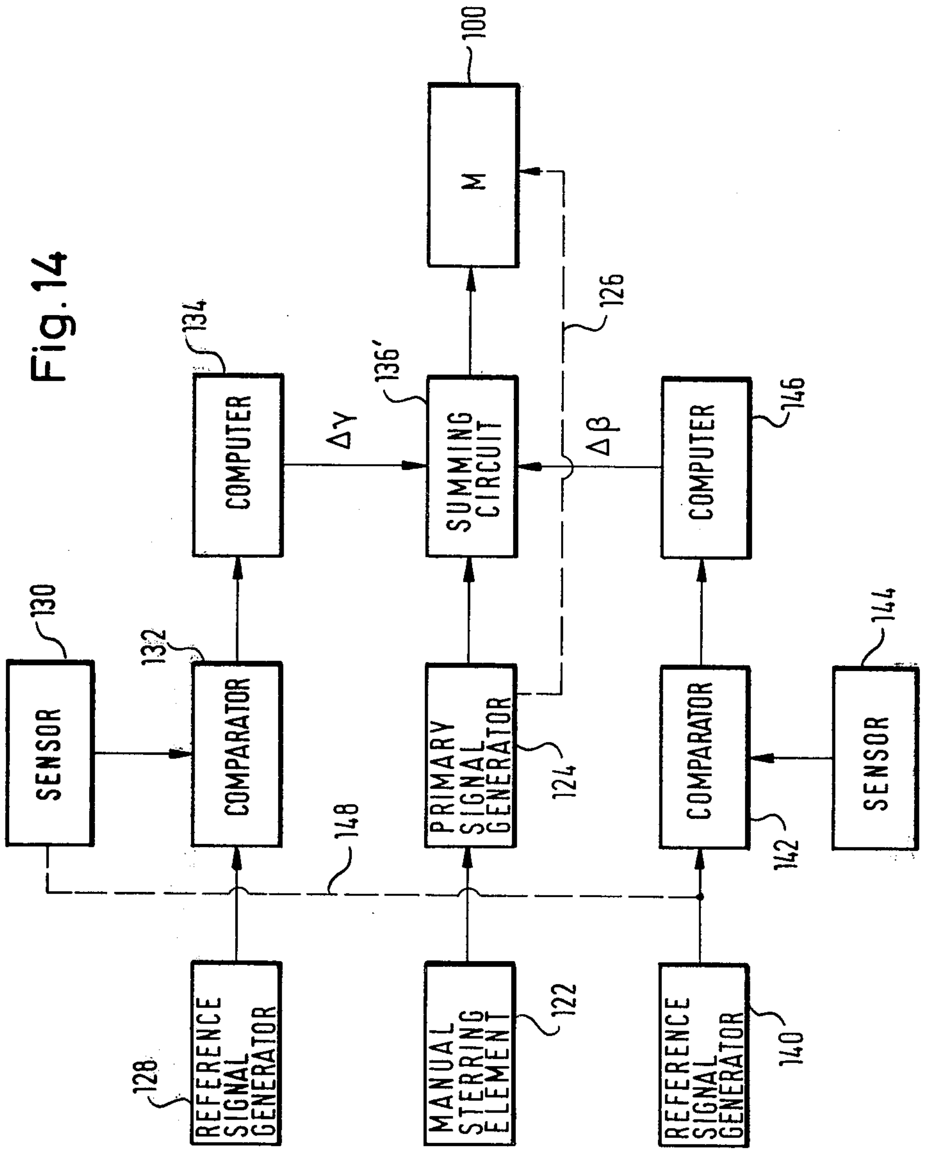

FIGS. 9 to 12 diagrammatically illustrate angular relationships between elements of the gantries of FIGS. 1 to 8; and FIGS. 13 and 14 are block diagrams of steering controls for the gantries of the invention.

Figure 1:
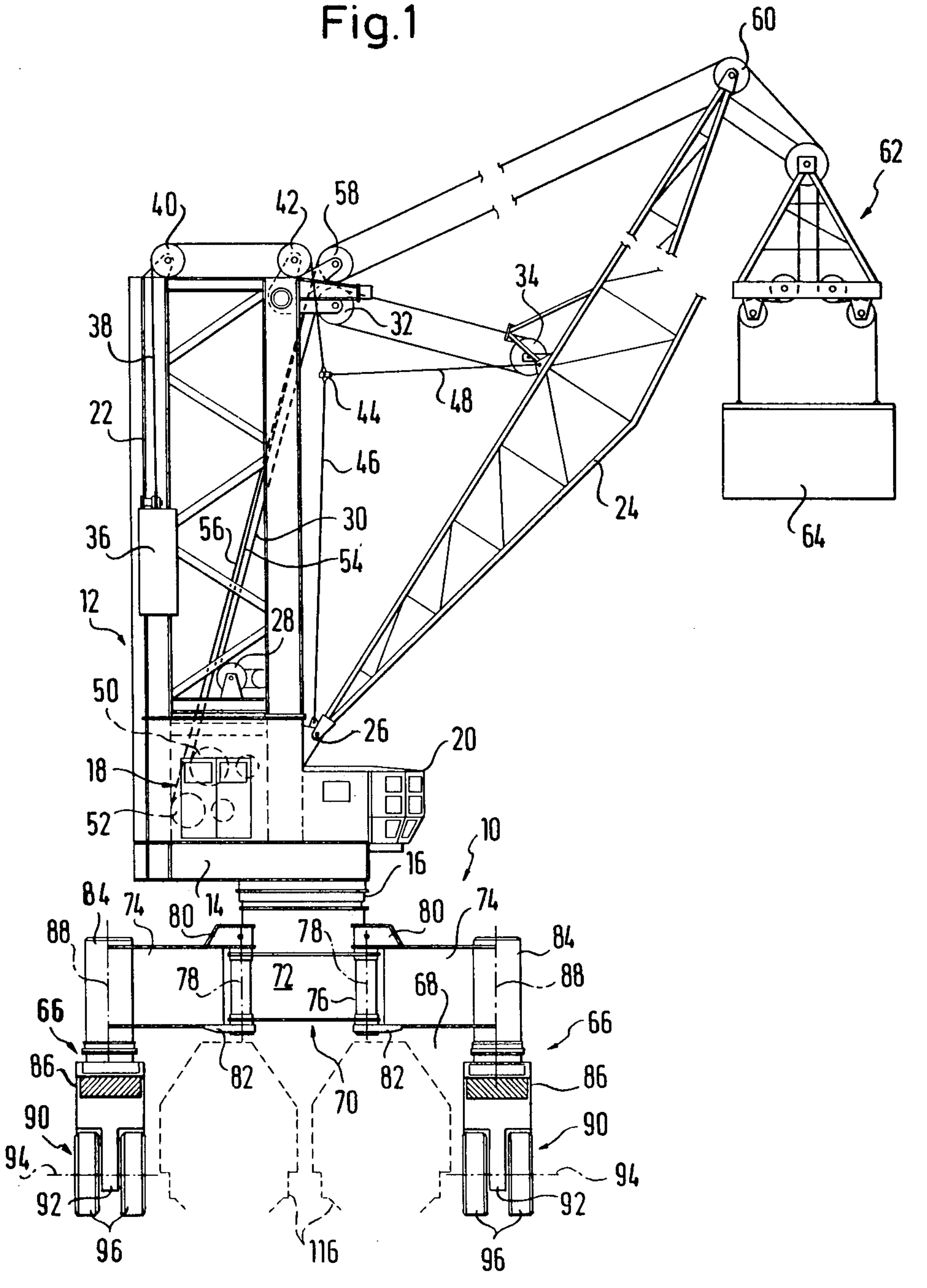
FIG. 1 shows a rotary crane on a gantry of the invention in front elevation.

Referring initially to FIG. 1, there is shown a traveling gantry 10 carrying a crane 12. The crane has a base 14 mounted on the gantry by means of a turntable 16. The base 14 supports an engine housing 18 enclosing diesel engines as prime movers, an electric generator and a hydraulic pump driven by the diesel engines and portions of necessary control equipment partly conventional and partly to be described in more detail. The operator and additional control equipment are housed in a cabin 20 on the base 14.

The upright frame 22 of the crane rises high above the housing 18. One end of the crane jib 24 is fastened to the lower end of the frame 22 by a pivot 26. A winch 28 on the frame 22 permits the jib to be tilted on the pivot 26 by means of a cable 30 trained over pulleys 32, 34 on the frame 22 and the jib 24. The weight of the jib is partly balanced by a counterweight 36 vertically guided on the frame 22 and suspended from a cable 38 which is trained over pulleys 40, 42 at the top of the frame 22. A ring 44 at the other end of the cable 38 and two cables 46, 48 diverging from the ring connect the cable 38 to two longitudinally spaced portions of the jib 24 adjacent the pivot 26 and the pulley 34 respectively.

The engine housing 18 also encloses two power operated winches 50, 52 on which respective ends of hoisting cables 54, 56 are wound. The hoisting cables pass over pulleys 58 at the top of the frame 22 and pulleys 60 at the free end of the jib 24 to a load carrier 62 from which a standardized shipping container 64 is suspended as a load. The crane described is basically conventional and too well known to require more detailed description of its structure and operation.

This invention is more specifically concerned with the gantry 10. The embodiment illustrated in FIGS. 1 and 2 has four upright members 66 which may laterally bound a portal or passage 68 wide enough and high enough to accommodate two freight trains 116 side by side, as indicated in broken lines in FIG. 1. The portal 68 is upwardly bounded by the bridge portion 70 of the gantry. The latter consists essentially of a heavy platform 72 whose horizontal top surface, in the illustrated example, is square and carries the turntable 16, and of four carrier arms 74 which are free to pivot about respective vertical axes 78 in bearings 76 at the four corners of the platform 72, each bearing including an upper bracket 80 and a lower bracket 82 on the carrier arm receiving the platform corner therebetween.

The free end of each carrier arm 74 is fixedly fastened to a cylindrical top portion of an upright member 66. The center portion of a normally horizontal beam 86 is axially secured to the lower end of each upright member 66 and is freely rotatable about the vertical axis 88 of the upright member. The two portions of each beam 86 at opposite sides of the associated upright member 66 carry respective undercarriages 90 approximately symmetrical relative to the axis 88. As is best seen in FIG. 1, each undercarriage 90 has a bearing assembly 92 in which the center of a single, horizontal axle 94 is journaled. The two ends of each axle 94 carry road wheels 96 whose treads have practically cylindrical road-engaging surfaces. Each undercarriage 90 may be turned on the beam 86 about a normally vertical axis 98 by a hydraulic motor 100. The wheels 96 of one undercarriage 90 on each beam 86 are driven by means of an electric motor 102 and a drive chain 104. The tread of at least one of the wheels 96 on the other undercarriage 90 may be engaged by a brake shoe 108 attached to the associated bearing assembly 92 by a pivot pin 106 when a hydraulic brake cylinder 110 is supplied with fluid.

Figure 2:
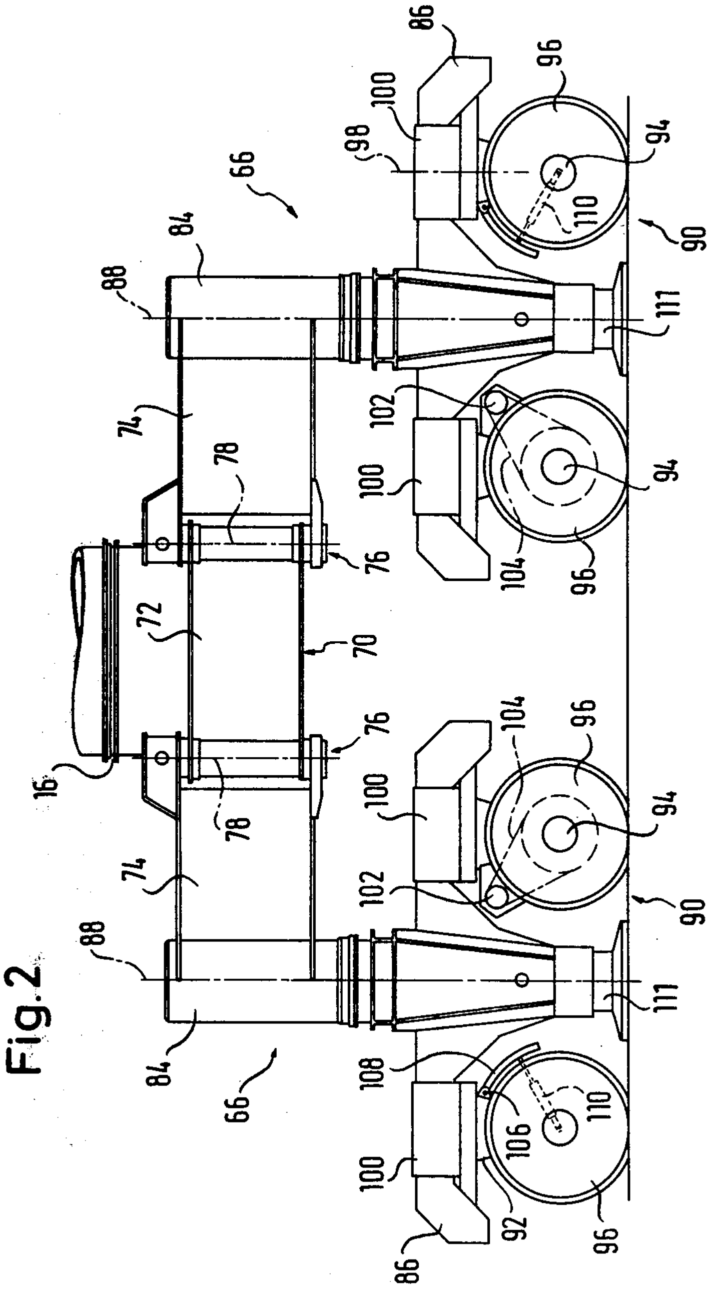
FIG. 2 illustrates the gantry of FIG. 1 in side elevation on a larger scale.

A hydraulic jack concealed in the lower part of each upright member is connected to an auxiliary supporting column 111 depending from the center of the associated beam 86. As shown in FIG. 2, the several columns 111 have been lowered into the common tangential plane defined by the bottom surfaces of the wheels 96 and thus engage the road surface on which the wheels 96 rest to relieve the wheels and their axles 94 from at least a portion of the weight of the gantry, the crane 12, and the load 64 hanging from the crane. If so desired, the columns 111 may be lowered further to lift the wheels 96 entirely off the ground in a manner shown in FIG. 4 with reference to a modified gantry of the invention. The columns 111 are retracted upward from the position shown in FIG. 2 while the gantry travels.

The gantry illustrated in FIGS. 3 to 7 in different, respective operating conditions differs from that shown in FIG. 2 mainly by a different auxiliary supporting arrangement, and elements common to both embodiments of the invention have been provided with the same reference numerals. They will not be described again.

The modified horizontal beam 86' associated with each upright member 66 carries two hydraulic jacks at its two ends which may be extended downward beyond the undercarriages 90. Only the outer ends of the piston rods 113 of the three jacks associated with each upright member 66 are exposed and carry each a supporting assembly 112 including a carrier 115 which consists essentially of two parallel, horizontally elongated plates 117. The centers of the plates are hingedly fastened to the piston rod 113 by a pin 119. The plates 117 are further connected by two shafts 121 oppositely spaced from and parallel to the pin 119. A wheel 123 carrying axially spaced, dual flanges on its tread is freely rotatable on each shaft 121 between the plates 117, the spacing of the flanges on the wheel tread being sufficient to receive a standard railroad rail therebetween.

The free ends of the shafts 121 project outward from the plates 117 respectively, and are journaled in the flanges of a channel section 125. Each channel section is dimensioned so that it may be swung 180° by hand between the position shown in FIGS. 3, 4, 7 in which the web 127 of the channel section is below the associated rail wheel 123, and the position seen in FIGS. 5 and 6 in which the wheels 123 downwardly project from the channel sections. When the piston rods 113 are expelled under fluid pressure from the associated, non-illustrated jack cylinders while the channel sections 125 are in the position shown in FIG. 3, the webs 127 ultimately reach the ground to transmit at least some of the weight of the gantry to the ground and to relieve the wheels 96. Further extension of the piston rods 113 causes the wheels 96 to be lifted from the ground as is shown in FIG. 4.

When the channel sections 125 are reversed before the supporting assemblies 112 are lowered from the positions shown in FIG. 2, the channel sections no longer prevent engagement of a supporting surface by the wheels 123. When the gantry of the invention is used in the freight yard of a railroad, a guide rail 129 may be mounted alongside the railroad track for engagement by the wheels 123 and to guide the gantry in its travel along the track in a position in which its portal 68 provides safe clearance for the freight cars 116. It is preferred that the wheels 123 be aligned in the direction of gantry movement with the gap between the two coaxial wheels 96 so that the latter may be lowered to travel on the ground on either side of the guide rail 129 and thereby to propel the gantry as is shown in FIG. 5.

Figure 6:
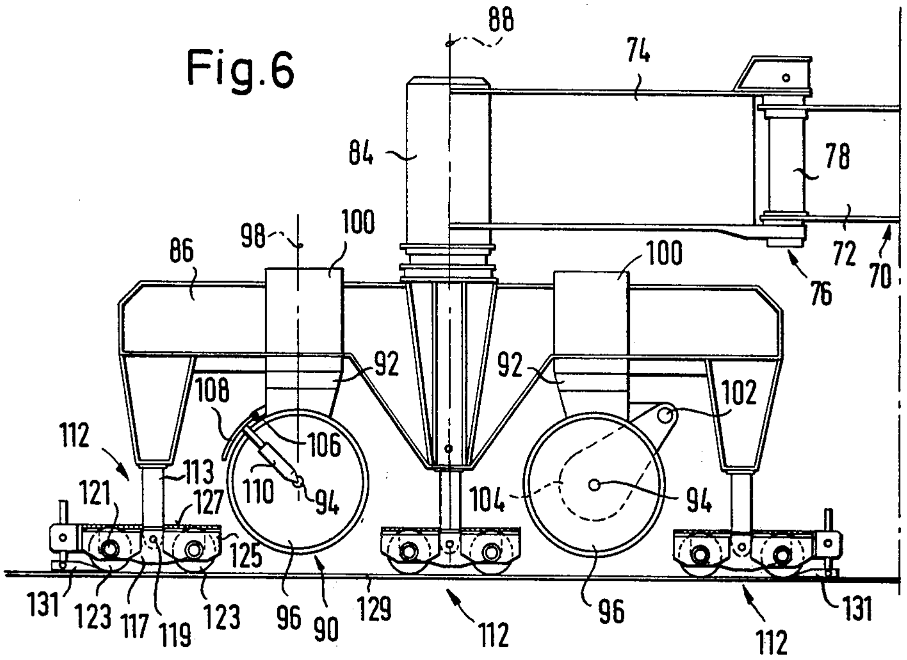
Figure 7:
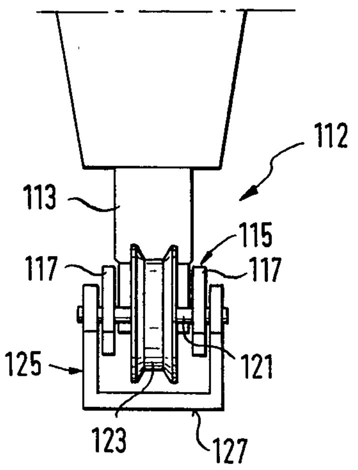
FIG. 7 is an enlarged, front-elevational view of a detail of the gantry of FIG. 3.

Alternatively, the piston rods 113 may be extended far enough to lift the road wheels 96 from the ground so that the gantry rests only on the rail wheels 123 and on guide rails 129, as is shown in FIG. 6. Because the wheels 123 are free to rotate on the shafts 121, brake shoes 131 are preferably provided on the carriers 115 for preventing the gantry from rolling away from a selected position.

It is not normally possible for the crane operator to gage from his position in the cabin 20 whether the wheels 123 are properly aligned with a guide rail 129 before the wheels are lowered. It is preferred, therefore, to provide the gantry with sensors, similar to conventional sensors provided on motorcars for sensing the proximity of a curb, which generate a suitable signal in the cabin 20 when the wheels 123 and the rail 129 are aligned. Alternatively, such sensors may operate a signal on the gantry indicating to the engineer of a freight train whether he may safely enter the portal 68.

Figure 3:
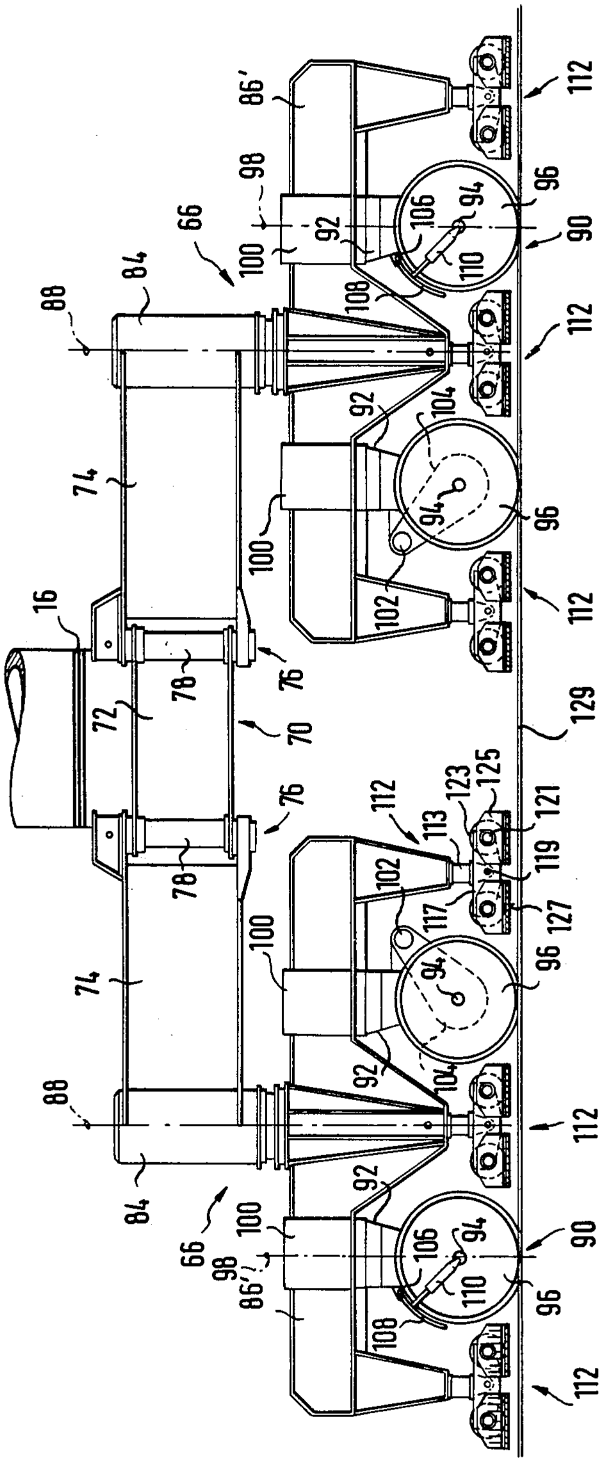
FIG. 3 is a view analogous to that of FIG. 2 of a modified gantry of the invention.
Figure 4:
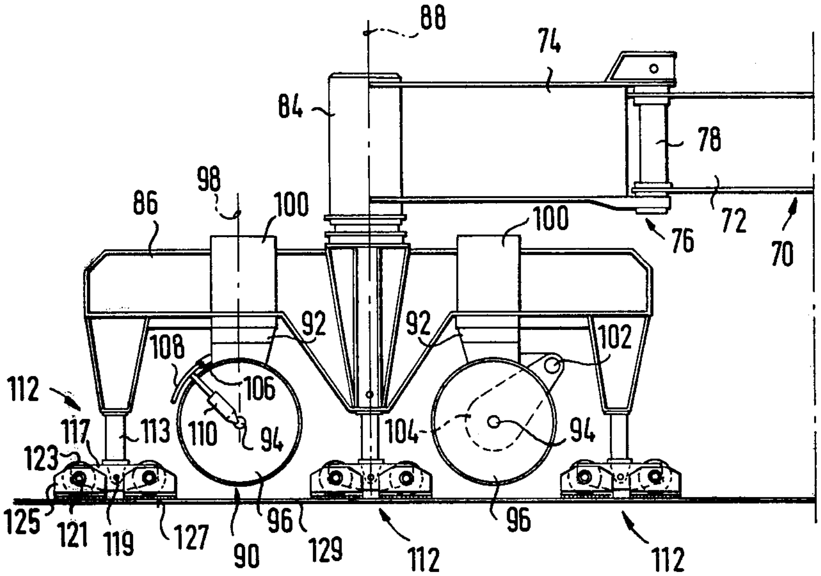
FIGS. 4 to 6 show one half of the gantry of FIG. 3 in respective, different operating conditions.
Figure 5:
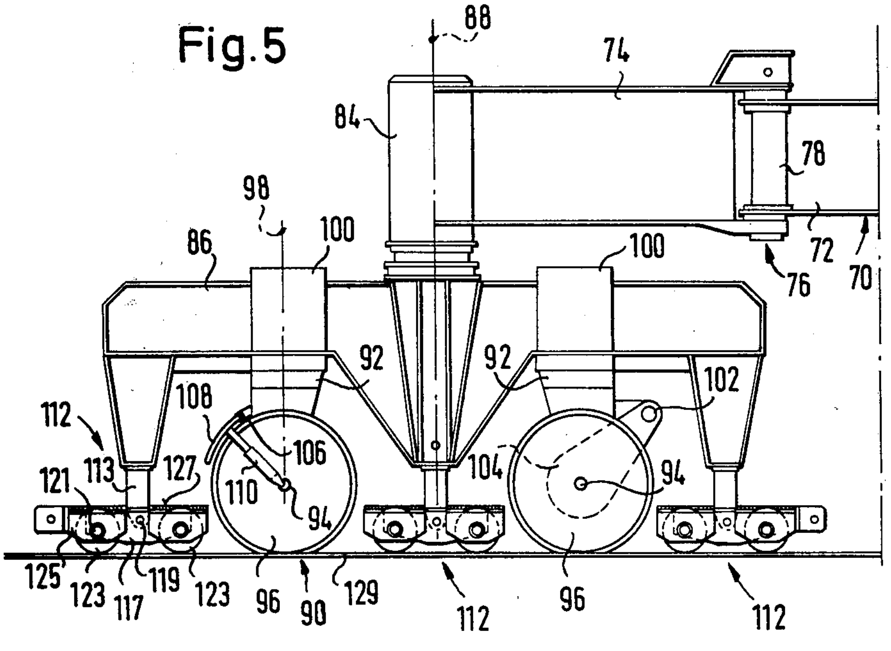

The channel sections 125 are preferably swung between the positions of FIGS. 3 and 5 by the crane operator by remote control, and suitable electromagnetic or hydraulic motors are commercially available. They have not been shown in the drawing for the sake of clarity.

Figure 8:
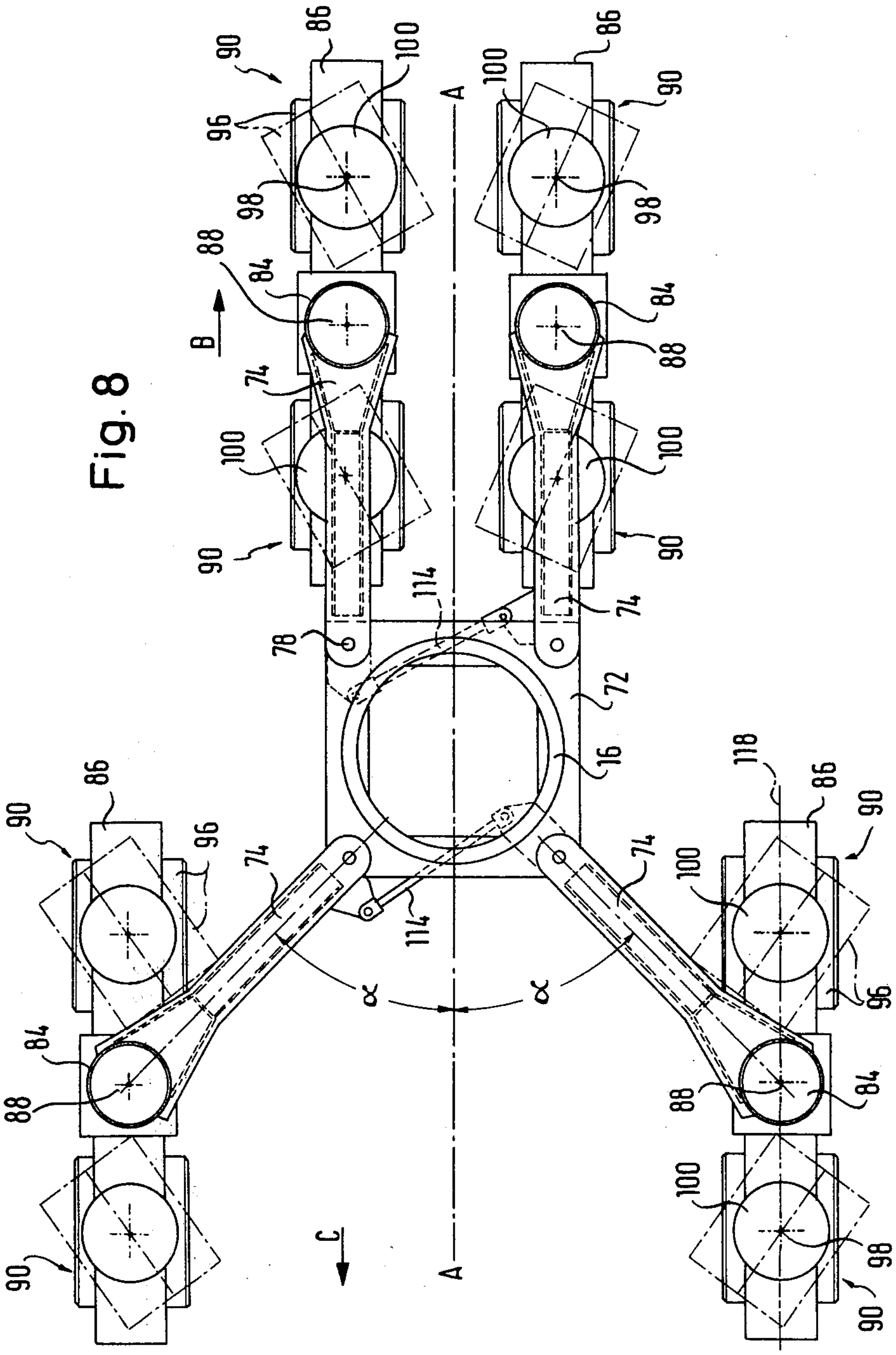
FIG. 8 illustrates the gantry of the crane of FIGS. 1 and 2 in top plan view.

As mentioned above, the carrier arms 74 are free to move angularly on the platform 72, and friction in the bearings 76 is held to the unavoidable minimum. However, each carrier arms 74 is connected to one other arm by a hinged coupling rod 114 in such a manner that the carrier arms 74 of each connected pair assume symmetrical angular positions relative to a vertical plane A—A, as is shown in FIG. 8. In all angular positions of the several carrier arms 74, the position of the plane A—A is fixed relative to the platform 72. In the illustrated embodiment, it passes through the center of the platform at right angles to two edges of the platform and parallel to the other two edges so that the plane A—A divides the platform 72, and thus the entire bridge portion 70 into two symmetrical halves.

Two of the carrier arms 74 are shown in FIG. 8 to diverge from the plane A—A at respective angles $\alpha$ of approximately 45° in a horizontal plane which is closely adjacent and parallel to the top surface of the platform 72. The coupling rods 114 are dimensioned and mounted to permit the angle $\alpha$ to assume a maximum value of about 60° and a minimum value of 0° or less, as shown by two carrier arms 74 which are approximately parallel in the position normally assumed during travel of the gantry. When it is desired to reduce the values of the angles $\alpha$ for movement of the gantry to another site, the undercarriages 90 are pivoted into the positions indicated in FIG. 8 by chain-dotted lines in which their planes of rotation converge in the direction of travel indicated by an arrow C. When the wheels then are turned for movement of the gantry, the leading carrier arms 74 pivot toward each other on the platform 70 until the undercarriages are returned to the fully drawn positions relative to the beams 86. The arms 74 shown in parallel positions in FIG. 8 diverge when their undercarriages 90 are turned from the fully drawn to the chain-dotted positions, and the gantry moves in the direction of the arrow B. In view of the magnitude of the forces involved, it is not normally practical to provide arresting devices for holding the carrier arms 74 in a desired position, and such arresting devices are not needed if the undercarriages 90 and their wheels 96 can be steered as will now be explained with reference to FIGS. 9 to 14.

Figure 9:
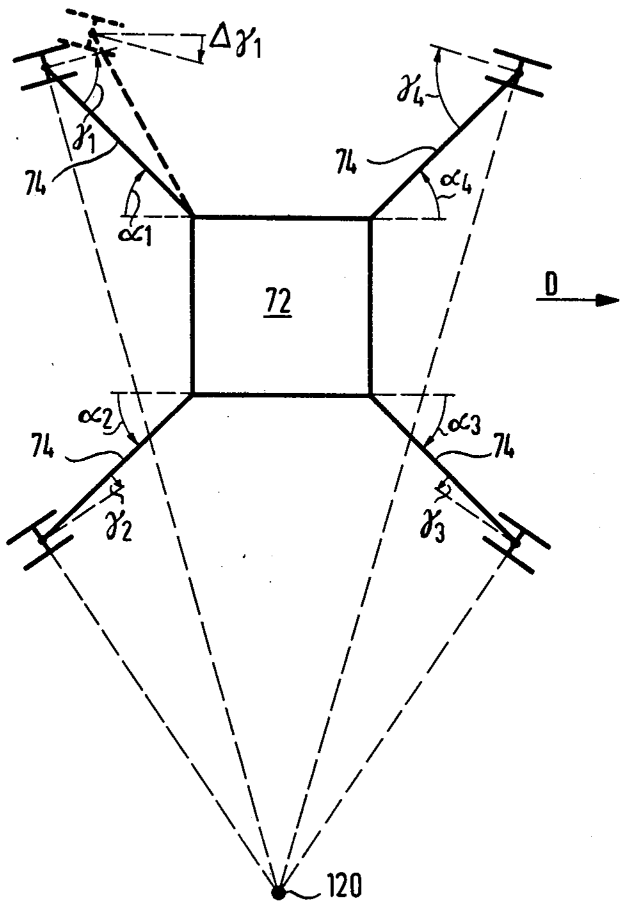

In FIG. 9, the platform 72 is represented by a square, but the actual shape of the platform is not in itself important. The carrier arms 74 are represented by straight lines 74 defining respective angles $\alpha_1$, $\alpha_2$, $\alpha_3$, and $\alpha_4$ with lines parallel to the aforementioned plane of symmetry so that $\alpha_1$ substantially equals $\alpha_2$, and $\alpha_3$ substantially equals $\alpha_4$. For a simpler explanation, it is assumed initially that only a single undercarriage, represented by an H-shape is associated with each arm 74, the planes of rotation of the paired wheels on the undercarriages defining angles $\gamma_1$ to $\gamma_4$ with the respective arms 74. These planes of rotation are parallel to an upright median plane 118 of each undercarriage indicated in FIG. 8.

If the platform 72 is to move in a straight path indicated by the arrow D, all wheels are tilted so that their planes of rotation are parallel to the direction of travel, as is not specifically illustrated. If the gantry is to travel in a circular arc about a point 120, the several hydraulic motors 100 are energized to turn the undercarriages into the positions shown in FIG. 9 in which the axes of rotation of the several wheels intersect each other in the point 120.

A suitable control arrangement may be derived from the teachings of my afore-mentioned earlier patent. Another one is shown in the block diagram of FIG. 13 and may be duplicated for each undercarriages, some elements of the several steering controls being common to more than one undercarriage or coupled to each other, if desired. A steering element 122 manually set by the operator in the cab 20, such as a steering wheel, causes a primary signal generator 124 to transmit a suitable basic angle signal to each hydraulic motor 100 through a connecting line 126 when the gantry is to move in an arc. For return to travel in a straight path, another basic signal reverses the original turning movement of the undercarriages. This simple mode of operation is effective only if the angles $\alpha_1$ to $\alpha_4$ are not affected by the travel of the gantry, an assumption valid only if external forces, such as may be due, for example, to unevenness of the ground traveled, are insignificant. To compensate for accidental pivotal movement of the carrier arms 74, or to permit intentional carrier arm movement, there is provided a reference signal generator 128, manually controlled by the generator, which feeds a signal indicative of the desired value of $\alpha$ for each pair of carrier arms 74 to a comparator circuit 132 which also receives the output signal of a conventional, non-illustrated sensor 130 mounted on the platform 72 and indicating the actual value of the angle $\alpha$. The resulting error signal is fed to a computer 134 programmed to produce a signal indicative of a correction angle $\Delta\gamma$ that is to be superimposed on the basic signal of the signal generator 124 in a summing circuit 136 for transmission of a suitably modified control signal to the motor 100.

The positive or negative magnitudes of the necessary modifications of the angles $\gamma$ for desired changes in the angles $\alpha$ are indicated in Tables I and II of FIG. 9, the directions of the curved arrows in FIG. 9 being considered positive, and all listed values for $\gamma$ being based on gantry movement in the direction of the arrow D. By way of example, there is shown a correction angle $\Delta\gamma_1$ for shifting one of the carrier arms 74 from the actual position indicated by a broken line into the desired position represented by a fully drawn line. An angle of the illustrated magnitude between an actual and a desired position of a carrier arm 74 will not normally occur and has been chosen here solely for the convenience of illustration.

Actually, the carrier arms of the invention are each associated with two undercarriages 90, and the relatively simple steering arrangement described above with reference to FIGS. 9 and 13 needs further refinement. The two under carriages associated with each horizontal beam 86 not only are turned by their hydraulic motors 100, their angular positions may also be affected by the unimpeded turning of the beams 86 on the associated upright members 66. The angular positions of the beams 86 are changed or maintained only by pivoting the axles 94 in a horizontal plane.

Figure 10:
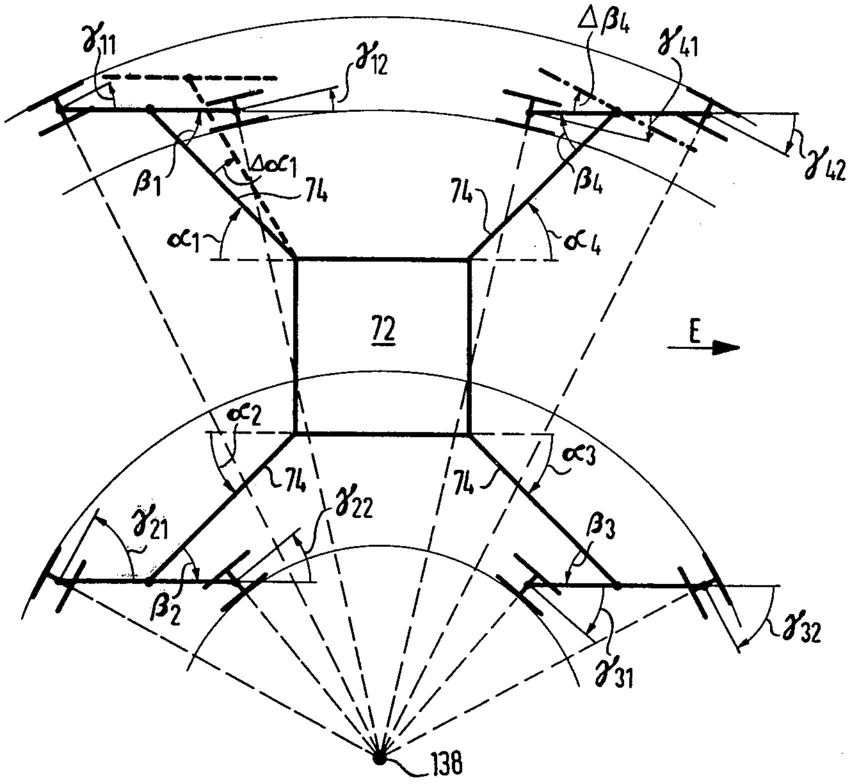

FIG. 10 diagrammatically illustrates the gantry shown in FIGS. 1 to 8 in the manner of FIG. 9, the differences between the two embodiments of FIGS. 1, 2, and 8 and FIGS. 3 to 7 being irrelevant for the purpose of this discussion. The angular positions of the carrier arms 74 are defined by angles $\alpha_1$ to $\alpha_4$ as in FIG. 9. The positions of the beam 86 are defined by angles $\beta_1$ to $\beta_4$ between vertical planes through the longitudinal axes of the arms 74 and of the associated beams 86 which intersect each other in the axis 88. The angular positions of the undercarriages 90 on the associated horizontal beams 86 are defined by angles $\gamma_{11}$, $\gamma_{21}$, $\gamma_{31}$, and $\gamma_{41}$ between the beams and the planes of rotation of the wheels 96 on the undercarriages 90.

In the condition of the gantry illustrated in FIG. 10, the axes of rotation of all wheels intersect each other in one point 138, and the gantry travels in a circular arc about the point if the wheels are driven. As long as external forces do not cause a shifting of a beam 86 or of a carrier arm 74, all beams 86 are parallel, each angle $\alpha$ is equal to the associated angle $\beta$, and neither the carrier arms 74 nor the beams 86 change their respective angular positions relative to the platform 72. The resulting mode of operation is the same as described with reference to FIG. 9, and the same procedure applies for changing from curvilinear to rectilinear travel or back.

If correction of steering errors or the effects of external forces are to be taken into consideration, the apparatus illustrated in FIG. 13 needs to be modified to account for the fact that not only the angular positions of the carrier arms 74, but also those of the beams 86 may be affected. Apparatus capable of dealing with this more complex situation is diagrammatically illustrated in FIG. 14. It includes elements 122, 124, 126, 128, 130, 132, 134, 100 not significantly different from those designated by the same reference numerals in FIG. 13 and functioning in the same manner.

There may be an additional reference signal generator 140 producing a signal indicative of the desired angular position of the beam 86 associated with the undercarriage 90 whose motor 100 is to be controlled by the apparatus of FIG. 14. The actual angular position of the beam is sensed by a sensor 144 on the upright 66 and the output signals of the generator 140 and the sensor 144 are compared in a comparator circuit 142. The resulting error signal is suitably modified by a computer 146. A summing circuit 136' combines the output signal $\Delta\beta$, $\Delta\gamma$ of the computers 134, 146 with the primary signal of the generator 124 to furnish a control signal to the motor 100. The several undercarriages 90 are set by respective systems of the type shown in FIG. 14 to cause travel of the gantry in a desired path while maintaining desired angular positions of the carrier arms 74 and the horizontal beams 86.

It is generally advantageous that the beams 86 assume positions on the associated carrier arms 74 in which each value of $\alpha$ is equal to the corresponding value $\beta$. If the gantry is to be operated in this manner, it is unnecessary to provide separate sensors for the angular positions of the carrier arms and beams, and the same sensor 140 (or 128) may feed the same reference signal to both comparator circuits 132, 142, as indicated by a broken line 148 in FIG. 14.

It is evident from FIG. 10 that any angle correction of a carrier arm 74 is affected by both undercarriages pivotally mounted on the same horizontal beam, and that the undercarriages must be turned in the same direction by their motors 100. If a carrier beam 74 is in the position shown by a broken line in FIG. 10 instead of the desired position represented by a solid line, it is necessary to reduce both angles $\gamma_{11}$ and $\gamma_{12}$ of the respective undercarriages to achieve the desired change $\Delta\alpha_1$. If a horizontal beam deviates from its proper position, the two undercarriages supported thereon must be turned in opposite directions to shift the beam through an angle $\Delta\beta_4$ shown in FIG. 10. Thus, the angular positions of the carrier arms 74 and of the associated horizontal beams 86 may be adjusted independently by suitable energizing the two motors 100 mounted on the beam.

Table III in FIG. 10 indicates the direction in which the angles $\gamma_{11}$ and $\gamma_{12}$ need to be modified if both associated angles $\alpha_1$ and $\beta_1$ deviate from the proper values. In each of the four fields into which Table III is divided by double lines, the upper line in the field or quandrant indicates the direction of the necessary correction of a deviating value of $\alpha_1$, the lower line the correction for a deviating value of $\beta_1$. Whether the combined corrections are greater or smaller than zero depends on actual conditions if the two corrections are in opposite directions. It will be understood that Table III applies to gantry movement in the direction of the arrow E, and that a reversal of gantry movement will involve an interchange of negative and positive corrections in the Table.

The angular positions of all carrier arms 74 and all horizontal beams 86 are normally kept constant by the steering control arrangement shown in FIG. 14 regardless of the direction of movement and of the configuration of the path in which the gantry is steered by the operator. These angular relationships are changed only if the operator sets the reference signal generators in a manner to reduce the spread of the paired carrier arms 86 for travel over narrow roads or to cause the carrier arms to diverge for improved stability of the crane.

A different mode of controlling the arms 74 and beams 86 is illustrated in FIGS. 11 and 12 with reference to a gantry whose basic mechanical elements are almost the same as shown in FIGS. 1 to 8. The same reference characters as in FIG. 10 designate identical mechanical elements and corresponding angles. However, only one of the undercarriages 90 on each beam 86 is provided with an energized steering motor 100, the other undercarriage being fixedly secured on the beam by its inactive motor or otherwise in a position in which the planes of rotation of its two wheels are parallel to the direction of elongation of the supporting horizontal beam 86.

When it is desired to move the platform 72 in a circular arc about a point 138 in the direction of the arrow F, and the front axles 94 on each beam 86 are tilted in a horizontal plane until their axes intersect each other in the point 138, the beams 86 are turned on the associated upright members 66 and arms 74 during incipient gantry movement until the wheels on the rear axles offer minimum resistance to gantry travel, that is, until the axes of the rear axles also intersect each other in the center of curvature 138, as is shown in FIG. 12.

The control circuit illustrated in FIG. 14 is applicable to the gantry illustrated in FIGS. 11 and 12 with minor changes. The reference signal for the angular position of each beam 86 varies with the radius of the curve through which the gantry is to be moved. The reference signal generator 140 thus is preferably coupled with the manual steering element 122 in a manner to relieve the crane operator from the task of separately adjusting the reference signal generator if no changes in carrier arm positions are needed.

Corrections of the undercarriage positions may be made in response to deviations of the carrier arm angles $\alpha$ in a manner described above. Because of the signal $\Delta\beta$ produced by the deviation of a beam position from that needed for the condition of FIG. 12, each front undercarriage is turned not only into the position in which its axle would be aligned with the center of curvature 138, as indicated by angles $\gamma_1$ to $\gamma_4$, but further through an angle $\gamma'_1$ to $\gamma'_4$ shown in FIG. 11. Such oversteering accelerates the turning of the beam 86 into its ultimate, desired position (FIG. 12) whereupon the axles 94 assume their proper positions.

After the gantry reaches the condition illustrated in FIG. 12, the angular relationships of the carrier arms, the horizontal beams, and the steered front wheels are maintained automatically in the manner described above with reference to FIG. 10. Table IV and V show the directions of corrective changes of the angles $\gamma_1$ and $\gamma_2$ if the angles $\alpha_1$ and $\beta_1$ should deviate from their desired values. Two values of $\Delta\gamma_1$ or $\Delta\gamma_2$ are associated in the Tables with each value of $\Delta\beta_1$ and $\Delta\beta_2$. The upper value relates to correction of the angle $\alpha$, the lower one to correctin of the angle $\beta$. Movement of the carrier arm 74 about its pivot axis 78 cannot be separated strictly from a turning movement of the associated horizontal beam 86 about the axis 88. However, the components of the corrections of $\gamma$ may be chosen in such a manner as to affect predominantly angular displacement of the carrier arm 74 or of the beam 86.

The carrier arms 74 may be swung toward or away from each other in the same manner as described above by setting reference signals for $\alpha$. The desired changes are accomplished more quickly if the automatic controls for the angles $\beta$ are inactivated until the desired values of $\alpha$ are almost reached.

A gantry controlled in the manner of FIGS. 11 and 12 requires less smooth ground for its movement through a curve than the gantry of FIG. 10, as is evident from the radial spacing of the circular arcs in which the innermost and outermost wheels 96 travel. Also the power required for steering only four wheels is smaller than that needed for steering all eight undercarriages in the embodiment of FIG. 10. However, the necessary swinging movement of the beams 86 during each change in the direction of travel of the gantry of FIG. 12 requires some time, and the available free width of the portal 168 is smaller in the gantry of FIG. 12 than in that of FIG. 10 under otherwise analogous conditions. The relative importance of one or the other of these features will determine the selection of the most advantageous mode of operations.

The necessary difference between the rotary speeds of the wheels 96 traveling along the inside and the outside of a curve is achieved without difficulty both with hydraulic drive motors and electric motors in a conventional manner. Differences in the friction impeding the turning of the several undercarriages may also be compensated for in a known manner to avoid quickest turning of the undercarriage subjected to the least frictional drag.

The weight of the gantry is transferred in the embodiments of the invention shown in FIGS. 1 to 8 between supporting assemblies and wheels 96 on each upright member 66 by shifting the supporting assemblies relative to the common tangential plane defined by the lowermost portions of the several wheels 96, and such an arrangement is generally preferred. However, the same result is achieved by mounting the supporting assemblies in fixed vertical positions on the upright members 66 and by shifting the bearing assemblies 92 on the beams 86 by means of hydraulic jacks or like devices.

Other variations and modifications will readily suggest themselves to those skilled in the art. It should be understood, therefore, that the foregoing disclosure relates only to embodiments of the invention which are presently preferred, and that it is intended to cover all changes in the examples of the invention herein chosen for the purpose of the disclosure which do not constitute departures from the spirit and scope of the appended claims.

What is claimed is:

1. A traveling gantry comprising:

(a) a bridge portion including:

(1) a platform having an upwardly directed face, said face defining a normally horizontal plane, (2) a plurality of elongated carrier arms, and (3) a plurality of hinge means securing respective longitudinal end portions of said carrier arms to said platform for pivoting movement in a plane parallel to and adjacent to said horizontal plane about respective pivot axes spaced from each other and extending transverse to said planes, (4) each said carrier arm having a free longitudinal end portion remote from the associated said hinge means;

(b) at least one road wheel secured to said free longitudinal end portion of each said carrier arm for movement about a horizontal extending axis of rotation; and (c) steering means for turning said wheel about an upright steering axis transverse to said axis of rotation;

(d) said carrier arms being freely rotatable about said respective pivot axis;

(e) said steering means comprising a steering motor control means for controlling said steering motor, said control means including a superimposing circuit for providing a combined steering signal;

(f) a primary signal generator, said superimposing circuit having a first input connected to said primary signal whose output signal represents a desired angular position of the road wheel with respect to the associated carrier arm about said steering axis;

(g) a comparator, a reference signal generator, a sensor, said superimposing circuit having a second input connected to the output of said comparator, one input of said comparator being connected to said reference signal generator delivering a signal representing a desired angular position of said associated carrier arm with respect to said platform about said pivot axis, a further input of said comparator being connected to said sensor indicating the actual angular position of said carrier arm with respect to said platform about said pivot axis so that the output of said comparator provides a deviation signal representing the deviation of said actual angular position from said desired angular position of said carrier arm with respect to the platform; and (h) signal processing means being provided between the output of said comparator and said superimposing circuit, said signal processing means delivering in response to the deviation signal a correction signal to said superimposing circuit, which correction signal represents an alteration of said desired angular position of said road wheel with respect to its associated said carrier arm, which alteration is necessary for moving said carrier arm from its actual angular position to its desired angular position with respect to said platform.

2. A gantry as set forth in claim 1, wherein respective, lowermost, circumferential parts of said wheels define a plane tangential to said parts, the spacing of said plane from said platform being greater than the greatest horizontal dimension of said platform, two of said upright members in all positions of said carrier arms defining therebetween an unobstructed portal having a horizontal width greater than said greatest dimension.

3. A gantry as set forth in claim 1, further comprising an upright member secured to each of said free end portions and extending downward from said planes in the operating condition of the gantry, said upright member having a portion downwardly remote from said plane of said platform, a plurality of horizontally elongated beam members, each beam member having two longitudinally terminal portions and a central portion secured to said portion of a respective one of said upright members for free rotary movement of said beam member about a vertically extending axis, and said at least one road wheel being secured to one of said longitudinally terminal portions for movement about said axis of rotation, and said steering means including means for turning said at least one road wheel relative to said beam member about said upright steering axis.

4. A traveling gantry as claimed in claim 1 further comprising a plurality of horizontally elongated beam members, each said beam member having two longitudinally terminal portions and a central portion secured to the free end of said carrier arm for free rotary movement of said beam member about a vertically extending axis, said at least one road wheel being secured to one of said longitudinally terminal portions for movement about said axis of rotation, and said steering means including means for turning said at least one road wheel relative to said beam member about said upright steering axis, a further comparator, a further reference signal generator, a further sensor, said superimposing circuit having a third input connected to the output of said further comparator, one input of said further comparator being connected to said further reference signal generator delivering a signal representing a desired angular position of said beam member with respect to its associated said carrier arm about said vertically extending axis, a further input of said further comparator being connected to said further sensor indicating the actual angular position of said beam member with respect to its associated said carrier arm about said vertically extending axis, so that the output of said further comparator provides a further deviation signal representing the deviation of said actual angular position from said desired angular position of said beam member with respect to its associated carrier arm, further signal processing means being provided between said output of said further comparator and said superimposing circuit, said further signal processing means delivering in response to said further deviation signal a further correction signal to said superimposing circuit, which further correction signal represents an alteration of the desired angular position of said road wheel with respect to its associated said carrier arm, which alteration is necessary for moving said beam member from its actual angular position to its desired angular position with respect to its associated carrier arm.

5. A gantry as set forth in claim 4, further comprising another road wheel secured to the other longitudinally terminal portion of each beam member for movement about an associated, horizontally extending axis of rotation.

6. A gantry as set forth in claim 5, wherein said steering means include means for turning said other road wheel relative to said beam member about another, upright steering axis alternatively in the same direction at which said at least one road wheel is turned and in a direction opposite to the direction of turning of said at least one road wheel.

7. A gantry as set forth in claim 5, further including means for holding the axis of rotation of said other road wheel in a fixed angular position relative to said beam member while said steering means turn said at least one road wheel relative to said beam member about said steering axis.

8. A gantry as set forth in claim 1, wherein two of said hinge means define a plane of reference equidistant from the pivot axes defined by said two hinge means and perpendicular to said normally horizontal face, the gantry further comprising coupling means coupling the carrier arms secured to said platform by said two hinge means for simultaneous, symmetrical movement toward and away from said plane of reference.

9. A gantry as set forth in claim 8, wherein said steering means include means for turning said one road wheel and said other road wheel on each of said beam members into a simultaneous position in which the axes of rotation of all said road wheels substantially intersect each other in a common point.

10. A gantry as set forth in claim 9, further including means for holding the axis of rotation of said other road wheel on each beam member in a fixed angular position relative to the associated beam member during said turning of the road wheels into said simultaneous position.

11. A gantry as set forth in claim 1, further comprising a crane mounted on said face for rotation about a vertically extending axis.

12. A gantry as set forth in claim 1, further comprising drive means energizable for turning said road wheel about said axis of rotation thereof.

13. A traveling gantry comprising:

(a) a bridge portion including:
  (1) a platform having an upwardly directed face, said face defining a normally horizontal plane,
  (2) a plurality of elongated carrier arms,
  (3) a plurality of hinge means securing respective longitudinal end portions of said carrier arms to said platform for pivoting movement in a plane parallel to and adjacent to said horizontal plane about respective pivot axis spaced from each other and transverse to said planes, and
  (4) each said carrier arm having a free longitudinal end portion remote from the associated said hinge means;
(b) at least one road wheel secured to said free longitudinal end portion of each said carrier arm for movement about a horizontally extending axis of rotation;
(c) steering means for turning said wheel about an upright steering axis transverse to said axis of rotation; and
(d) a plurality of supports respectively mounted on said carrier arms and adjustably extendable downward from the same, when extended respective lowermost portions of said supports defining a plane of engagement with subjacent ground, respective lowermost circumferential parts of said wheels defining a plane tangential to said parts, and shifting means in operative engagement with said supports for shifting said planes relative to each other in the vertical direction.

14. A gantry as set forth in claim 13, wherein said shifting means include means for shifting said supports in a vertical direction toward and away from a position in which said plane of engagement is downwardly spaced from said tangential plane.

15. A gantry as set forth in claim 14, wherein said lowermost portion of each support includes a wheel having a flanged tread and being freely rotatable about a horizontally extending axis.

* * * * *